(12) United States Patent
Reass et al.

(10) Patent No.: US 8,165,939 B1
(45) Date of Patent: Apr. 24, 2012

(54) METHOD OF SETTLING A REAL ESTATE TRANSACTION AND SYSTEM IMPLEMENTING THE METHOD

(76) Inventors: Richard M. Reass, Virginia Beach, VA (US); Kenneth A. Taylor, Suffolk, VA (US)

( * ) Notice: Subject to any disclaimer, the term of this patent is extended or adjusted under 35 U.S.C. 154(b) by 0 days.

(21) Appl. No.: 11/788,876

(22) Filed: Apr. 23, 2007

(51) Int. Cl.
*G06Q 40/00* (2012.01)

(52) U.S. Cl. ............................... 705/35; 705/39; 705/44

(58) Field of Classification Search ........................ None
See application file for complete search history.

(56) References Cited

U.S. PATENT DOCUMENTS

| | | | |
|---|---|---|---|
| 7,044,365 B2 | 5/2006 | Witherspoon | |
| 7,386,528 B2 * | 6/2008 | Maloche et al. | 1/1 |
| 7,412,707 B2 * | 8/2008 | Peters et al. | 719/318 |
| 7,698,212 B1 * | 4/2010 | Peirson et al. | 705/38 |
| 2001/0037415 A1 | 11/2001 | Freishtat et al. | |
| 2002/0029194 A1 * | 3/2002 | Lewis et al. | 705/39 |
| 2003/0182206 A1 | 9/2003 | Hendrix et al. | |
| 2003/0233326 A1 | 12/2003 | Manley et al. | |
| 2004/0133516 A1 | 7/2004 | Buchanan et al. | |
| 2004/0215560 A1 | 10/2004 | Amalrat et al. | |
| 2004/0220885 A1 * | 11/2004 | Salzmann et al. | 705/80 |
| 2004/0236647 A1 | 11/2004 | Acharya | |
| 2004/0236688 A1 * | 11/2004 | Bozeman | 705/42 |
| 2005/0033690 A1 | 2/2005 | Antognini et al. | |
| 2005/0121517 A1 * | 6/2005 | Igval et al. | 235/385 |
| 2005/0137953 A1 | 6/2005 | McDonough et al. | |
| 2008/0021815 A1 * | 1/2008 | Erbey et al. | 705/38 |
| 2008/0086420 A1 * | 4/2008 | Gilder et al. | 705/44 |

OTHER PUBLICATIONS

Murray, Michael, Fannie Mae Purchases e-Mortgages from Bridgespan, Real Estate Finance Today, Mar. 4, 2002, vol. 19, iss. 9, p. 6, 1 pg.*
PR Newswire, Stewart sets second quarter record highs, Jul. 25, 2003.*
Bank News, New solutions, Apr. 2002, vol. 102, iss. 4, p. 12, 2 pgs.*

* cited by examiner

*Primary Examiner* — Rajesh Khattar
*Assistant Examiner* — Carol See
(74) *Attorney, Agent, or Firm* — David L. Banner

(57) ABSTRACT

An automatic, web-based, integrated method and system for processing financial details of a real estate settlement or other similar transaction. The system incorporates modular functionality to avoid duplicate entry of data. The design philosophy is such that anticipated actions are entered into the system. Since the system knows what is expected, by monitoring actual transactions and comparing them to the anticipated transactions, real-time identification of exceptional situations is possible. This real time identification of a problem allows corrections to quickly be made to prevent financial losses, fines, or other penalties. The system is adapted to seamlessly interact with bank software and systems, for example, existing positive pay banking systems as well as with a user's financial or other similar application software. The system provides exception reports on a periodic (e.g., daily) basis to management and operations personnel.

10 Claims, 13 Drawing Sheets

METHOD OF SETTLING A REAL ESTATE TRANSACTION AND SYSTEM IMPLEMENTING THE METHOD

FIELD OF THE INVENTION

The invention pertains to systems and methods for settling real estate transactions, and, more specifically to a web-based, automated, integrated system for ensuring the integrity of financial transactions and for matching anticipated transactions with realized transactions to quickly detect discrepancies therebetween.

BACKGROUND OF THE INVENTION

Every real estate transaction ends in a settlement session where the buyer and the seller of a particular piece of real property conclude all financial arrangements pertinent to the sales transaction. Typically, relatively large amounts of money are involved, particularly when the real property is a commercial property. In addition, monies must typically be disbursed to multiple payees. Many of these multiple disbursements must be timely made in accordance with one or more statutes or other operating regulations. When large dollar amounts are involved, the interest incurred on a daily basis makes swift transfer and depositing of funds desirable.

Presently, real property settlement involves many manual steps. While tools (including software or other computer-based tools) exist to help perform individual settlement steps, many manual operations such as data entry leave numerous possibilities for innocent error. Resolution of even such innocent errors may result in great expenses to the party or parties responsible for the settlement transactions. Also, much time may be expended in resolving such errors. Embarrassing situations such as insufficient funds in a fiduciary account result in lost revenues and possible penalties. Because no coherent systems exist to detect errors in substantially real time, it may be days or weeks before the error is discovered. As is true in any error recovery situation, the more time that passes between the occurrence of the error and attempts to rectify it, the more difficult and time consuming the task becomes.

Current systems, in addition to being highly prone to innocent errors, also afford numerous opportunities for fraud. Detecting fraud is often more difficult than uncovering innocent errors in that the perpetrator of the fraud may take steps to mask his or her actions. Fraud currently costs practitioners in the real estate settlement industry millions of dollars per year.

DISCUSSION OF THE RELATED ART

U.S. Pat. No. 7,044,365 for METHOD FOR RECONCILING A FINANCIAL ACCOUNT FROM A PORTABLE ACCOUNT REGISTER, issued May 16, 2006 to Glenn Steven Witherspoon, disclosed digital account reconciliation.

United States Pregrant Publication 2003/0233326 for SYSTEM AND METHOD FOR AUTOMATED ACCOUNT MANAGEMENT, published Dec. 18, 2003 upon application by Scott Manley et al., shows an automated escrow account management system.

United States Pregrant Publication 2004/0133516 for METHOD AND SYSTEM FOR PROCESSING FINANCIAL INSTRUMENT DEPOSITS, published Jul. 8, 2004 upon application by Danne L. Buchanan et al., shows validation notification and also posting of deposits in real time.

United States Pregrant Publication 2003/0182206 for ACCOUNTS PAYABLE ELECTRONIC PROCESSING, published Sep. 25, 2003 upon application by Thomas R. Hendrix et al., shows reconciliation and validation checks in a system for managing accounts payable.

United States Pregrant Publication 2005/0033690 for SYSTEM AND METHOD FROM DIGITAL BILL PRESENTMENT AND PAYMENT, published Feb. 10, 2005 upon application by Walter Gerard Antognini et al., discloses a system for digital payment incorporating elements of reconciliation.

United States Pregrant Publication 2001/0037415 for SYSTEM AND METHOD FOR SYNDICATED TRANSACTIONS, published Nov. 1, 2001 upon application by Gregg Freishtat et al., teaches services including customer authentication.

United States Pregrant Publication 2005/0149436 for FINANCIAL ACCOUNT MANAGEMENT, published Jul. 7, 2005 upon application by Steve Elterich, discloses shows an automated account management system which works with plural financial institutions. Aspects of financial management integrated into the Elterich system include bill payment, money transfers, and retirement planning.

United States Pregrant Publication 2004/0236647 for ELECTRONIC CHECKBOOK REGISTER, published Nov. 25, 2004 upon application by Ravi Acharya, shows automated checkbook balancing.

United States Pregrant Publication 2006/0271939 for ENTERPRISE-TO-ENTERPRISE INTEGRATION, published Nov. 30, 2006 to Eric Joris et al., shows enterprise-to-enterprise integration. Enterprise-to-enterprise integration concerns linking disparate business system, especially among a business and multiple, possibly smaller business partners, each possibly having different system types.

United States Pregrant Publication 2004/0215560 for INTEGRATED PAYMENT SYSTEM AND METHOD, published Oct. 28, 2004 upon application by Peter Amalraj et al., provides a payment expediting system (although this is not associated with a reporting system for an individual consumer).

United States Pregrant Publication 2005/0137953 for ASSET PLANNING AND TRACKING, published Jun. 23, 2005 upon application by John McDonough et al., teaches an automated personal asset management system.

Neither this Unites States patent nor these United States pregrant publications, taken singly or in any combination, anticipate or suggest the integrated, web-based financial system of the present invention.

SUMMARY OF THE INVENTION

In accordance with the present invention there is provided an integrated method and system for processing all financial details of a real estate settlement or other similar transactions. The novel system incorporates modular functionality to avoid duplicate entry of data or the need for multiple, stand-alone software tools or systems to accomplish most tasks associated with real estate settlement. The design philosophy of the novel method and system is such that anticipated actions (i.e., transactions) are automatically entered into the system. Since the system knows what is expected, by monitoring actual transactions and comparing the actual transactions to the anticipated transactions, real time identification of exceptional situations is possible. This real time identification of a possible problem allows corrections to be made quickly to prevent financial losses, fines, or other penalties. The inventive system is adapted to seamlessly interact with bank software and systems, for example, existing positive pay banking systems as well as a user's financial or other similar application software. The novel system provides exception reports on a periodic (e.g., daily) basis to management and operations personnel.

As used herein for the sake of simplicity, the term bank is intended to refer to any financial institution capable of performing bank-like transactions. Such institutions include banks, credit unions, saving and loan associations, and any other such institution chartered, licensed, or regulated by a state or the federal government.

It is, therefore, an object of the invention to provide a method and system for facilitating real estate settlement or similar financial processes.

It is another object of the invention to provide a method and system for facilitating real estate settlement processes that seamlessly interacts with existing user systems and/or application software.

It is a further object of the invention to provide a method and system for facilitating real estate settlement processes that may be seamlessly integrated with a so-called production system to extract data therefrom and upload data thereto.

It is an additional object of the invention to provide method and system for facilitating real estate settlement processes that is compatible with software systems and procedures of financial institutions, for example, banks.

It is a further object of the invention to provide a method and system for facilitating real estate settlement processes that incorporates an automated positive pay subsystem.

It is a still further object of the invention to provide a method and system for facilitating real estate settlement processes that incorporates automated account reconciliation processes that detect and report transaction abnormalities.

It is yet another object of the invention to provide a method and system for facilitating real estate settlement processes that tracks and reports all financial transactions.

It is an additional object of the invention to provide a method and system for facilitating real estate settlement processes that automatically tracks all funds flowing into and out of each settlement account.

It is an object of the invention to provide a method and system for facilitating real estate settlement processes that provides daily management reports, particularly exception reports.

It is a further object of the invention to provide a method and system for facilitating real estate settlement processes that prevents movement of funds between accounts to cover embezzlement of funds.

It is yet another object of the invention to provide a method and system for facilitating real estate settlement processes that ensures that sufficient funds are available in an account prior to processing a disbursement against the account.

It is an additional object of the invention to provide a method and system for facilitating real estate settlement processes that allows user configuration of an alert system to identify and report suspect transactions.

It is another object of the invention to provide a method and system for facilitating real estate settlement processes that incorporates and unifies other functions and features useful in settling real estate and other similar transactions.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

The present invention provides a secure (128 bit Secure Sockets Layer or SSL) web-based, automated, financial management tool that provides near real-time funds tracking, verification, and validation. The inventive system consists of five functional modules: a positive payment module, a tracking module, a reconciliation module, a report module, and a disbursement module. The inventive system is capable of simultaneously handling multiple bank accounts with multiple financial institutions.

For purposes of disclosure and illustration, the RynohLive™ web-based financial management software designed and distributed by Segin Systems of Virginia Beach, Va. has been chosen. The five modules (i.e., positive payment, tracking, reconciliation, report, and funds receipt/disbursement) are marketed under the trade names of RynohPay™, RynohTrax™, RynohRecon™, RynohReport™ and Rynoh+™, respectively by Segin Systems. Each of these modules interacts with other modules to provide an automated, integrated system for ensuring integrity in financial transactions by matching anticipated transactions with actual transactions to quickly identify errors. By comparing anticipated transactions with actual transactions, both innocent errors and fraudulent actions may be quickly detected and remedied.

Figure 1:
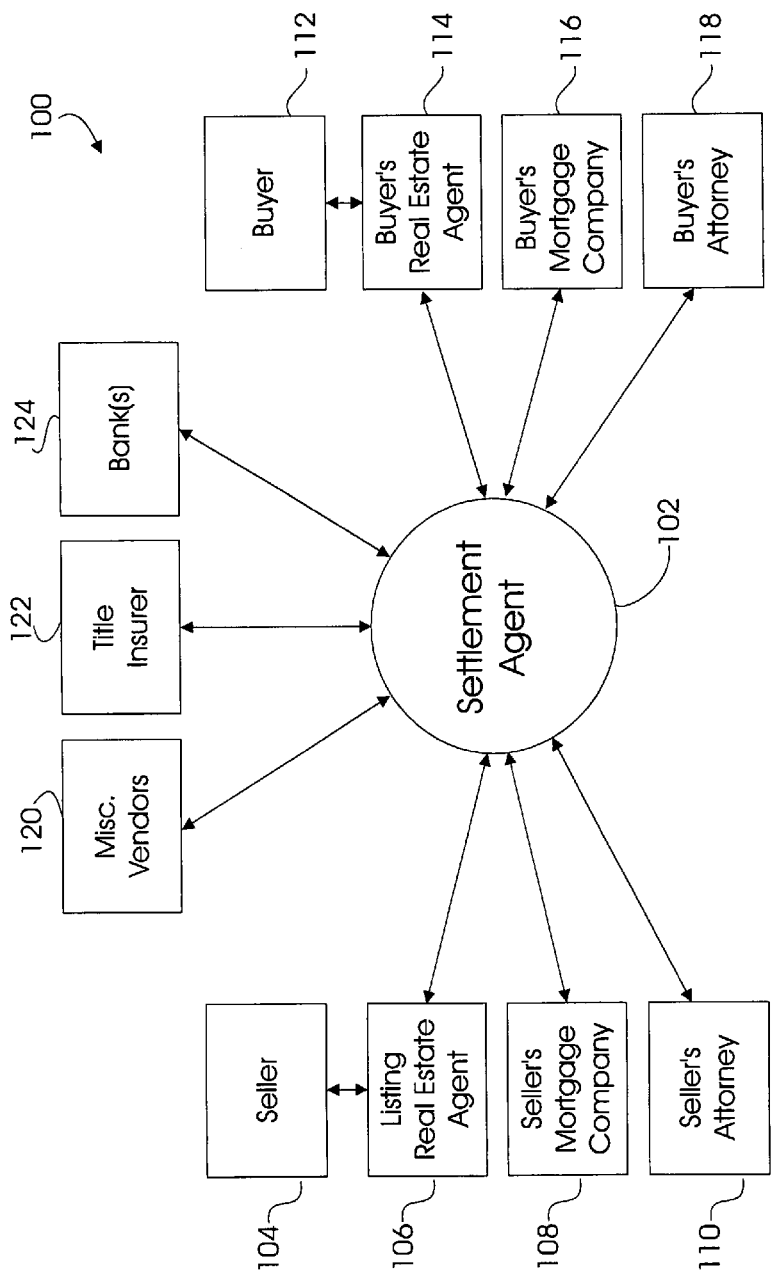
FIG. 1 is a schematic block diagram showing the relationship between a real estate settlement agent and other parties typically involved in a real estate settlement.

Referring first to FIG. 1, there is shown a high level, schematic diagram showing the relationship of a settlement agent to typical parties involved in a real estate settlement, generally at reference number 100. Settlement agent 102 is responsible for conducting a real estate settlement session. The many steps and processes involved in conducting a settlement session are believed to be known to those of skill in the art and, unless necessary to describe the novel systems and methods, are not further described in detail herein. Settlement agent 102 may typically be an attorney, title agent, escrow agent, or another commercial entity legally empowered to conduct such sessions. The specific details of the settlement agent form no part of the inventive method. Consequently, the invention comprehends any and all persons or organizations filling the role of settlement agent.

During settlement (i.e., the disbursement of funds from a real estate transaction), settlement agent 102 coordinates interaction between a buyer 112 and a seller 104. In a traditional sale, both a buyer 112 and a seller 104 are typically represented by respective real estate agents 114, 106, or legal counsel, not shown. In a refinance transaction, the buyer is the borrower and there is no "seller" in the traditional sense. It will be recognized that settlement agent 102 may, or may not be, the person conducting the real estate closing. For the sake of simplicity, however, it is assumed that settlement agent 102 has conducted the actual closing. This is immaterial as the inventive system is drawn to a system and method for dealing with the settlement process.

Typically in the settlement process money is received from buyer 112. Under certain circumstances, money may be received from seller 104 as well. All money received is disbursed by settlement agent 102. Disbursements often include paying off an existing mortgage on the real property being transferred or refinanced, paying for services such as, document recording, title searches, inspections, paying commissions, etc. As each settlement transaction is unique, any particular transaction may include any combination of receipts and disbursements in accordance with the signed HUD-1 settlement statement. It will be recognized that other disbursements not specifically identified may be required during settlement for a particular piece of real property. Consequently, the inventive method covers any and all necessary disbursements in addition to those chosen for purposes of disclosure.

For the sake of simplicity, only principal parties and agencies are shown in FIG. 1. It will be recognized that many of theses agencies or entities may be represented by intermediary agents, brokers, representatives, etc. not shown in FIG. 1. It is assumed for sake of simplicity, settlement agent 102 has conducted the actual real estate closing.

Settlement agent 102 normally interacts with a seller 104, a buyer 112, a listing real estate agent or agency 106, a buyer's real estate agent or agency 114, a seller's mortgage holder 108, a buyer's funding source (typically a bank or mortgage company) 116, attorneys or lawyers 110, 118 for the seller 104 and buyer 112, respectively. In addition, miscellaneous vendors and/or service providers 120 (e.g., inspectors, repair vendors, title searchers, etc., a title insurer 122, and at least one bank 124 (used for at least the maintenance of an escrow account, not shown) may also be involved. It should be noted that typically neither seller 104 nor buyer 112 interacts directly with settlement agent 102. Rather, seller 104 and buyer 112 are typically represented by their respective real estate agents 106, 114. It should be noted that the seller's mortgage holder 108 is represented merely to either receive payoff of the existing mortgage of seller 104 or, if a mortgage is assumable, to participate in the transfer of the existing mortgage from seller 104 to buyer 112.

All funds involved and required in the transfer of a piece of real property from seller 104 to buyer 112 pass through settlement agent 102. It will be recognized by those of skill in the art that a typical real estate settlement is complex with many financial transactions required. Settlement agent 102 is responsible for all reception and disbursement of funds to each of the entities 106, 108, 110, and 114-124. The United States Department of Housing and Urban Development ("HUD") requires the use of a universal Settlement Statement, typically referred to in the trade as "HUD 1". The HUD 1 form distinctly enumerates all funds to be received and disbursed at settlement time. As the details of the closing process form no part of the instant invention, no further description of the process is provided herein. The process is believed to be well understood by those of skill in the settlement art.

Figure 2:
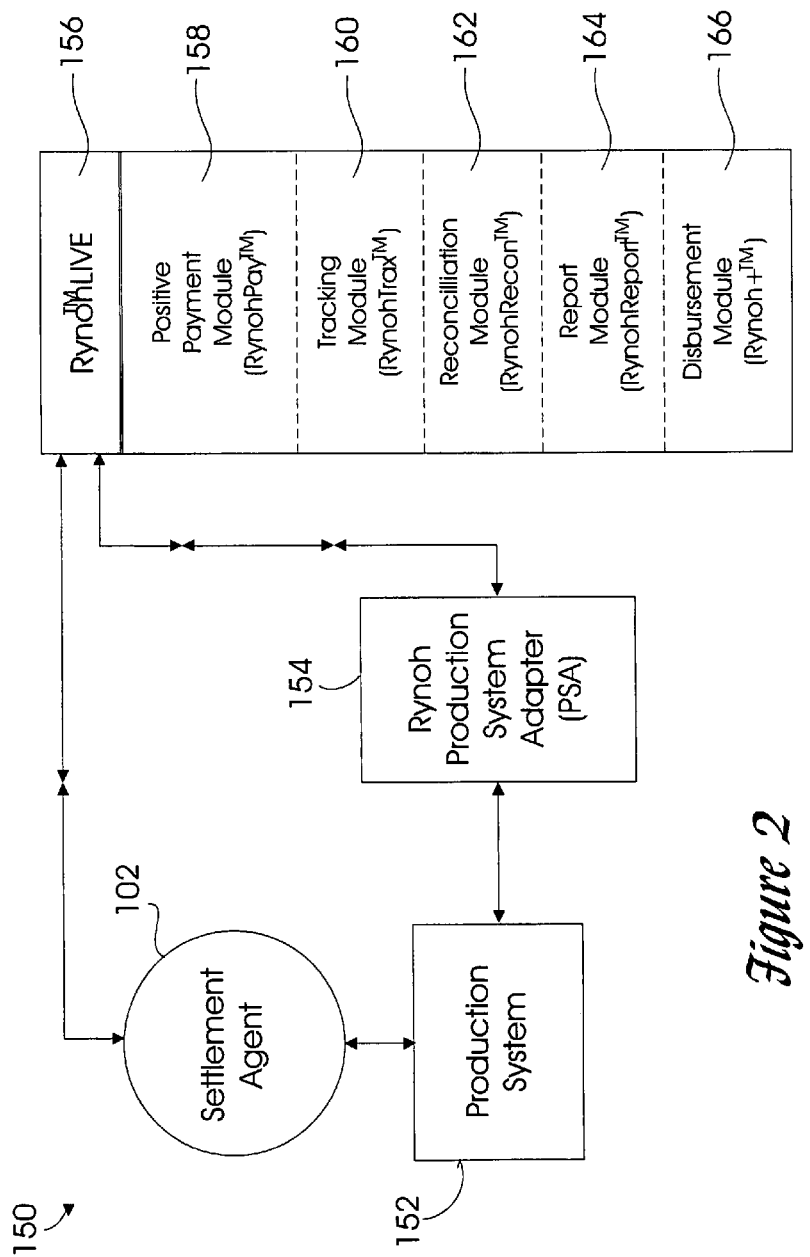
FIG. 2 is a simplified block diagram illustrating the relationship of the inventive system to a production system in an integrated real estate settlement.

Referring now also to FIG. 2, there is shown a high-level, schematic block diagram 150 showing the relationship between settlement agent 102, a generic production system 152, the RynohLive™ software system 156, and the Rynoh production system adapter (PSA) 154.

Settlement agent 102 typically uses an automated system, generally referred to as a "production system" 152 to perform the detailed financial transactions. Such production systems 152 may be specialized accounting systems specifically designed for the settlement industry. Such systems include SoftPro™, AIM for Windows™, TSS Title Express, RAMQUEST™, or LandTech™, all believed to be well known to those of skill in the art. In other cases, general accounting software such as QuickBooks™ may be used to perform the necessary financial transactions. In still other cases, proprietary systems built around data files or databases collect, manipulate, and report data required by the settlement process.

To perform its functions, the RynohLive™ system must receive data, not shown, from the production system 152. All required data from production system 152 is provided to the RynohLive™ system 156 via Rynoh PSA 154. Multiple PSA 154 versions may be provided, each specifically adapted to provide an interface with a known production system 152. As stated hereinabove, the RynohhLive™ software system 156 includes five modules: positive payment (RynohPay™) 158, tracking (RynohTrax™) 160, reconciliation (RynohRecon™) 162, report (RynohReport™) 164, and disbursement (Rynoh+™) 166. These modules 158, 160, 162, 164, 166 are interactive.

RynohPay™ 158 is an automated positive pay system that provides payee match for checks processed by a bank. Positive pay systems periodically provide a bank with a listing of all issued checks. The bank then clears only checks appearing on the list of issued checks. This feature virtually eliminates check fraud, and ensures that only validated checks are honored by the user's (i.e., settlement agent 102) bank 124 or other financial institution, not shown. RynohPay™ module 158 automatically transmits a file of issued checks to the bank 124 in accordance with a particular bank's file update schedule. This is typically at least once daily, some banks updating multiple times daily. As the update process is fully automatic, no operator intervention is required. Positive pay systems of the prior art are manual and are not sequenced to match internal bank update schedules. Verification of RynohPay™ module 158 submission and acceptance by the bank or other financial institution, not shown, is provided with each positive pay upload.

RynohTrax™ module 160 automatically tracks and validates all funds flowing into and out of at least one specified account. RynohTrax™ module 160 also ensures that funds have been received and are on deposit and available before any disbursement is allowed. A user defined alert list automatically provides notification when a specified transaction has or, in some cases, has not occurred within a specified time frame. For example, a user can request notification after a predetermined number of days if a mortgage pay-off check has not cleared an account. The alert criteria may be set to reflect specific time frames, payees, or dollar amounts. If settlement agent 102 manages multiple escrow accounts, RynohTrax™ module 160 provides an alert if funds are accidentally deposited or wired into an incorrect account.

RynohRecon™ module 162 provides periodic, automated three-way account reconciliation. This module ensures continual compliance with the HUD Real Estate Settlement Procedures Act (RESPA). Funds cannot be moved from one file (account) to cover another, and disbursements cannot be missed.

RynohReport™ module 164 provides periodic (typically daily) management reports. The generated reports rely on information from other modules 158, 160, 162, and 166. One report, typically labeled "The Morning Report", is used to determine that all deposits have been received by the bank, all pay-offs, recordings, and insurance payments have been received and presented for payment in a timely manner, and that incoming wire transfers and deposits match expected receipts. The Morning Report usually includes:

(1) All disbursements in a user defined alert status (i.e., checks not cleared);

(2) Unmatched transactions and reconciliation alerts such as items clearing the bank that have no corresponding match in production system 152, and deposits showing in the production system 152 as having been deposited, but which have not been shown to be on-deposit in the bank; and (3) A File Balance Report listing all files showing either a negative or positive balance. Files showing balances indicate files where disbursement has not been completed. This report is a powerful tool to immediately detect employee fraud.

Rynoh+ module 166 is a complete funds receipt and disbursement subsystem. In prior art systems and methods, handling receipt and disbursement of funds is a disjointed non-integrated process. When receipt and disbursement tasks are individually performed, the opportunity for error and fraud is greatly increased. Typically funds are received by either incoming wire transfer, certified funds, or personal check. These receipts must be manually posted into disbursing software used by settlement agent 102. There is no independent verification of actual receipt of incoming funds. Neither is there a comparison of anticipated to funds actually received. Also, there is no verification as to whether the funds received for each file were in the proper amount, and whether the received funds were "good". The Rynoh+™ module 166 automatically matches incoming wires from the bank and posts the incoming funds to the proper file and account (three-way trackability). Using a remote deposit capture program (i.e., Check 21), checks are scanned, uploaded, and deposited into the bank, posted into the RynohLive™ 156 databases as well as into any other disbursing software in use by settlement agent 102.

Check 21 is a federal law that enables banks to process checks electronically, which makes check processing faster and more efficient for the bank. Check 21 allows financial institutions to substitute the original paper check with an image of the item, thus electronically forwarding the check throughout the system instead of it being physically handled and sent from location to location during the clearing process. This greatly reduces the time it takes for the check to clear and/or be returned unpaid. To further increase efficiency, depositors (e.g., settlement agent 102) can implement the same type of technology.

As a part of the Check 21 process, certified funds may be verified as being "good". It should be noted that currently there is no central database for fraudulent, stolen, or missing certified/cashiers checks. This deficiency is overcome by the novel software systems of the present invention.

Further the Rynoh+™ module 166 ensures that only settlement files with money on deposit may have funds disbursed (i.e., check written, outgoing wire transfers processed, etc.) therefrom. Disbursement checks may be printed either in a central office or at a remote location. The Rynoh+™ module 166 allows wire transfers to be initiated and "sent" without utilizing a separate bank web site where the wire data must be manually entered, another process where errors may easily occur. For mortgage or other such payoff checks, couriers including but not limited to UPS, Fedex, DHL, may be used and shipments automatically tracked. All printed items are automatically stored electronically in the user's electronic storage system. Centralized disbursing can be accomplished using Rynoh+™ module 166.

Each module 158-166 is discussed in more detail hereinbelow.

The unique methodology employed by the novel RynohLive™ system of the invention is the integration of positive pay and reconciliation protocols along with algorithms that match actual to expected (i.e., anticipated) transactions. Anticipated transactions may include anticipated receipts and disbursements. These actions are accomplished automatically throughout the day without user intervention. There are no systems in the prior art that integrate positive pay and reconciliation processes. This integration, along with the capturing of anticipated transactions from the client settlement software (e.g., production system 152), makes the software system of the invention unique. This integration provides alerts and notification of key events through the use of both predefined and user defined alert criteria.

Figure 3:
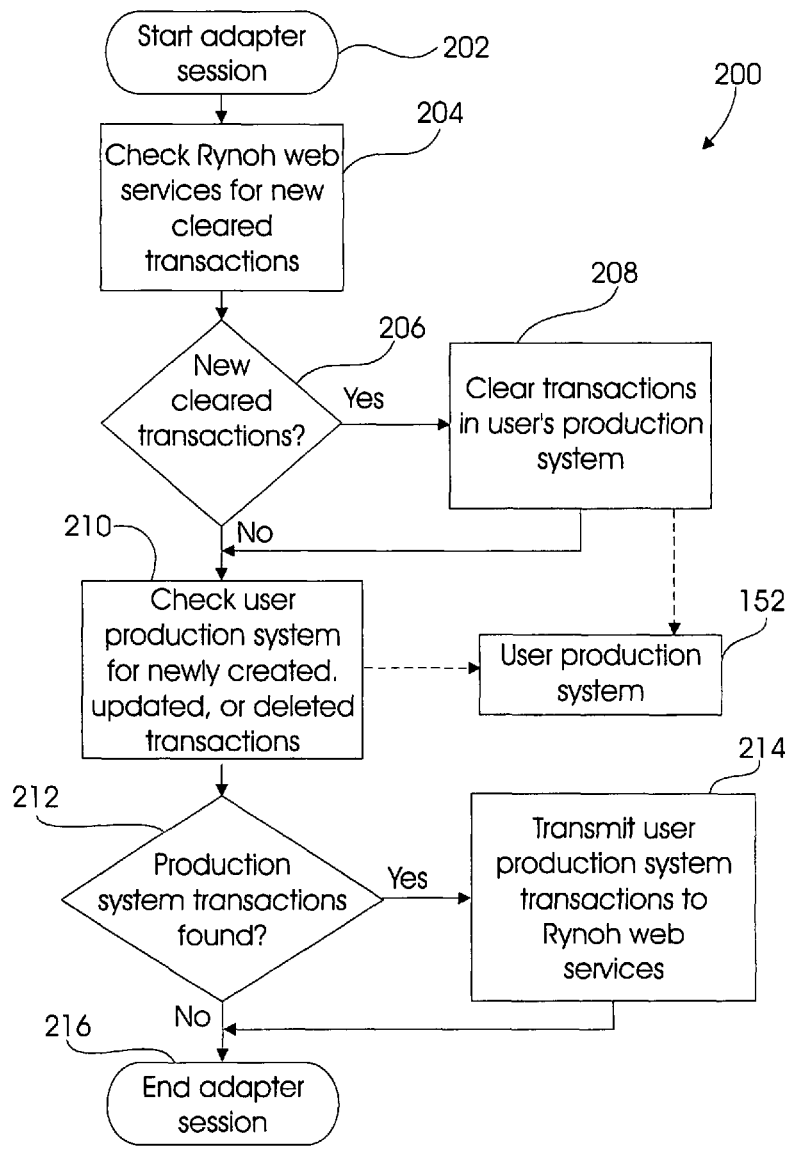
FIG. 3 is a simplified flow chart of the operation of the Production System Adapter of FIG. 2.

The RynohLive™ system 156 depends upon effective two-way interaction with production system 152. It is necessary to both extract data from, and update data within, production system 152. This is accomplished by PSA 154. Referring now also to FIG. 3, there is shown a simplified flowchart of the processes of PSA 154, generally at reference number 200.

The PSA 154 adapter session is started, block 202, and Rynoh web services is checked for new cleared transactions, block 204.

If new cleared transactions are found, block 206, these transactions are cleared in production system 154, block 208. If no new cleared transactions are found, block 206, production system 152 is checked for newly created, updated, or deleted transactions, block 210.

If new production system transactions are found, block 212, these new production system transactions are transmitted to Rynoh web services, block 214, and the adapter session is ended, block 216. If, however, no production system transactions are found, block 212, the adapter session is ended, block 216.

Rynoh web services are SOAP or XML "hooks" that allow access to internal files or databases, not shown, so that RynohLive™ 156 (FIG. 2) may extract data from, or push data into the files or database. Such methods and web services are believed to be well known to those of skill in the art and are not further discussed herein. It will be recognized that PSA 154 must generally be customized for interaction with each type, brand, and model of production system 152.

Figure 4:
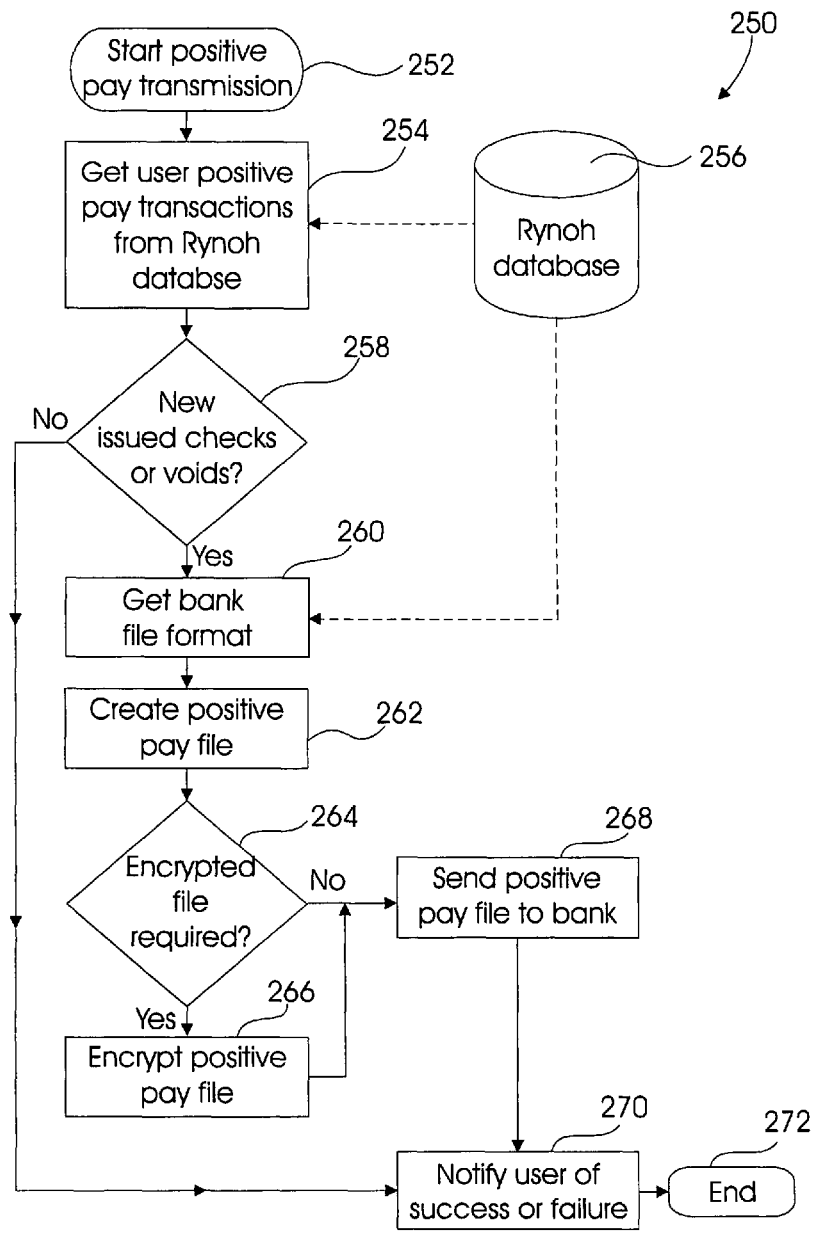
FIG. 4 is a simplified flow chart of the operation of the Positive Pay Module of FIG. 2.

Referring now also to FIG. 4, there is shown a simplified flow chart of the positive pay process embodied in the RynohPay™ module 158, generally at reference number 250. The process is started, block 252. This is typically done automatically in response to information regarding the update schedule of a particular bank.

First, transactions are retrieved from the Rynoh database 256, block 254.

Once the transactions are retrieved, block 254, the transaction file is checked to determine if there are any new checks, voids, or other pertinent transactions since the last file transmission, block 258.

If there are no new transactions, block 258, the user is notified, block 270, and the process is terminated, block 272. Otherwise, the necessary bank file format is retrieved, block 260.

Using bank file format information retrieved in block 260, a positive pay file is created, block 262.

If the bank requires encryption, block 264, the positive pay file is encrypted, block 266. Otherwise, control is transferred to block 268.

The positive pay file is next transmitted to the bank, block 268, and the user is notified of the success or failure of the transmission, block 270. The process is then terminated, block 272.

Banks typically update their internal "positive pay" and "paid item" files throughout the business day. This data is then promulgated to all bank branches. As previously discussed, positive pay systems of the prior art are manual, and require that a user manually upload check issue files throughout the day. Failure to upload a check issue file in a timely manner may result in valid issued checks not being honored when presented to the bank for payment. For example, a check may be issued by settlement agent 102 which the recipient takes directly to the bank. However, because the positive pay record has not been sent to the bank, when the teller scans the check for verification, the check may appear to be not valid. Bank rules prevent the bank from honoring the check. Such a situation may at the very least cause embarrassment and possibly result in tarnishing the reputation of settlement agent 102. The Rynoh positive pay module 158 eliminates this problem via automated scheduling that is matched to the varied update schedules of various banks.

Figure 5:
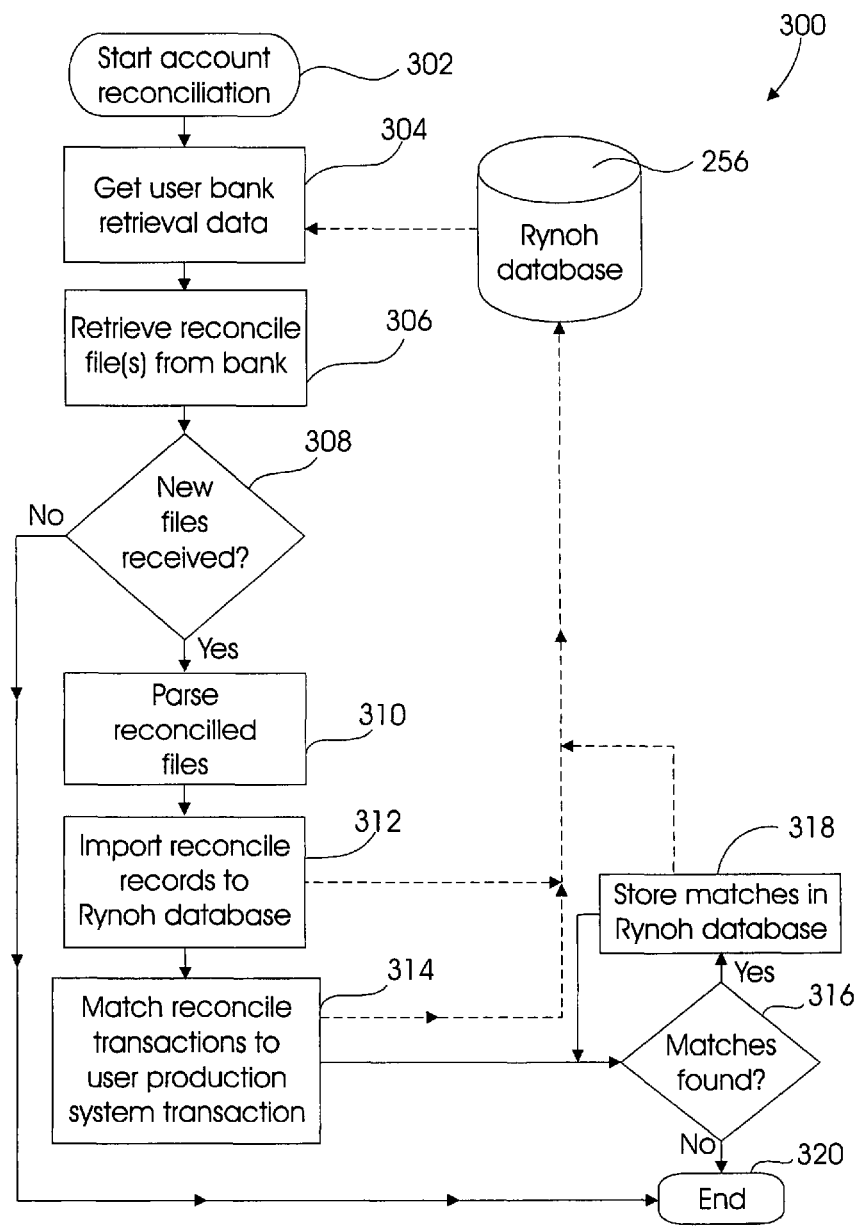
FIG. 5 is a simplified flow chart of the operation of the Reconciliation Module of FIG. 2.

Referring now to FIG. 5, there is shown a flow chart of the process of the Rynoh reconciliation (RynohRecon™) module 162, generally at reference number 300. The reconciliation process starts, block 302, and the user's bank retrieval data is obtained from the Rynoh database 256, block 304.

Using the reconciliation data obtained in block 304, the user files are retrieved from the user's bank, block 306.

If no new files are received, block 308, the process terminates, block 320. However, if new files are received, block 308, they are parsed, block 310.

The data resulting from the parsing operation of block 310 is imported into the Rynoh database 256, block 312.

Records are then matched to transaction records from the production system 152 (FIG. 2), block 314.

If no matches are found, block 316, the process terminates, block 320. However, if a match is found, block 316, the match information is stored in the Rynoh database 256, block 318, and control is returned to block 316.

Figure 6:
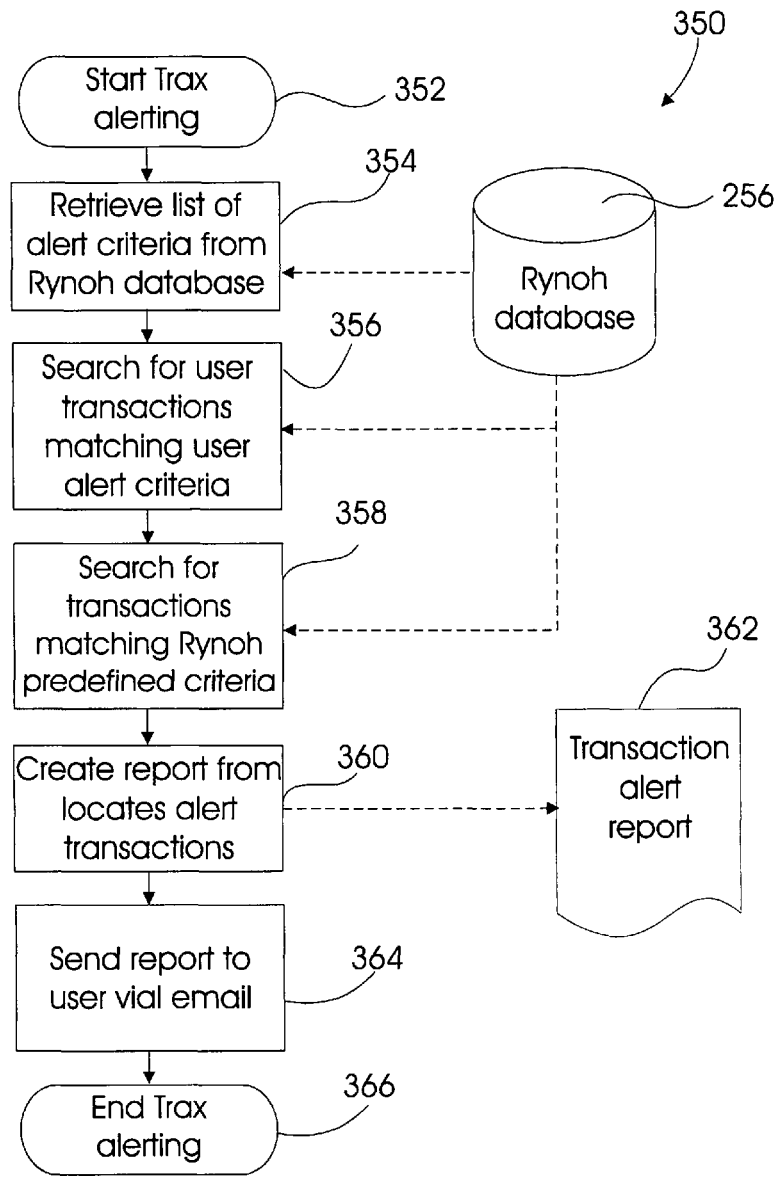
FIG. 6 is a simplified flow chart of the operation of the Tracking Module of FIG. 2.

Referring now to FIG. 6, there is shown a flow chart of the process of the Rynoh tracking (RynohTrax™) module 160, generally at reference number 350. The tracking process starts, block 352, and alert criteria are retrieved from the Rynoh database 256, block 354.

A search is performed on the customer transactions imported to the Rynoh database 256 (block 214, FIG. 3) for transactions matching user-supplied tracking criteria, block 356.

Next, a search is performed on reconcile transactions imported into Rynoh database 256 (block 318, FIG. 5) for transactions matching Rynoh predefined criteria, block 358.

Any located transactions, blocks 356, 358, are compiled, block 360, into a transaction report, block 362.

The transaction report 362 is then transmitted to a user, block 364. While e-mail transmission is chosen for purposes of disclosure, it will be recognized that transaction report 362 may be transmitted or delivered by any other suitable means such as fax, courier, mail, etc.

The tracking process ends at block 366.

Figure 7:
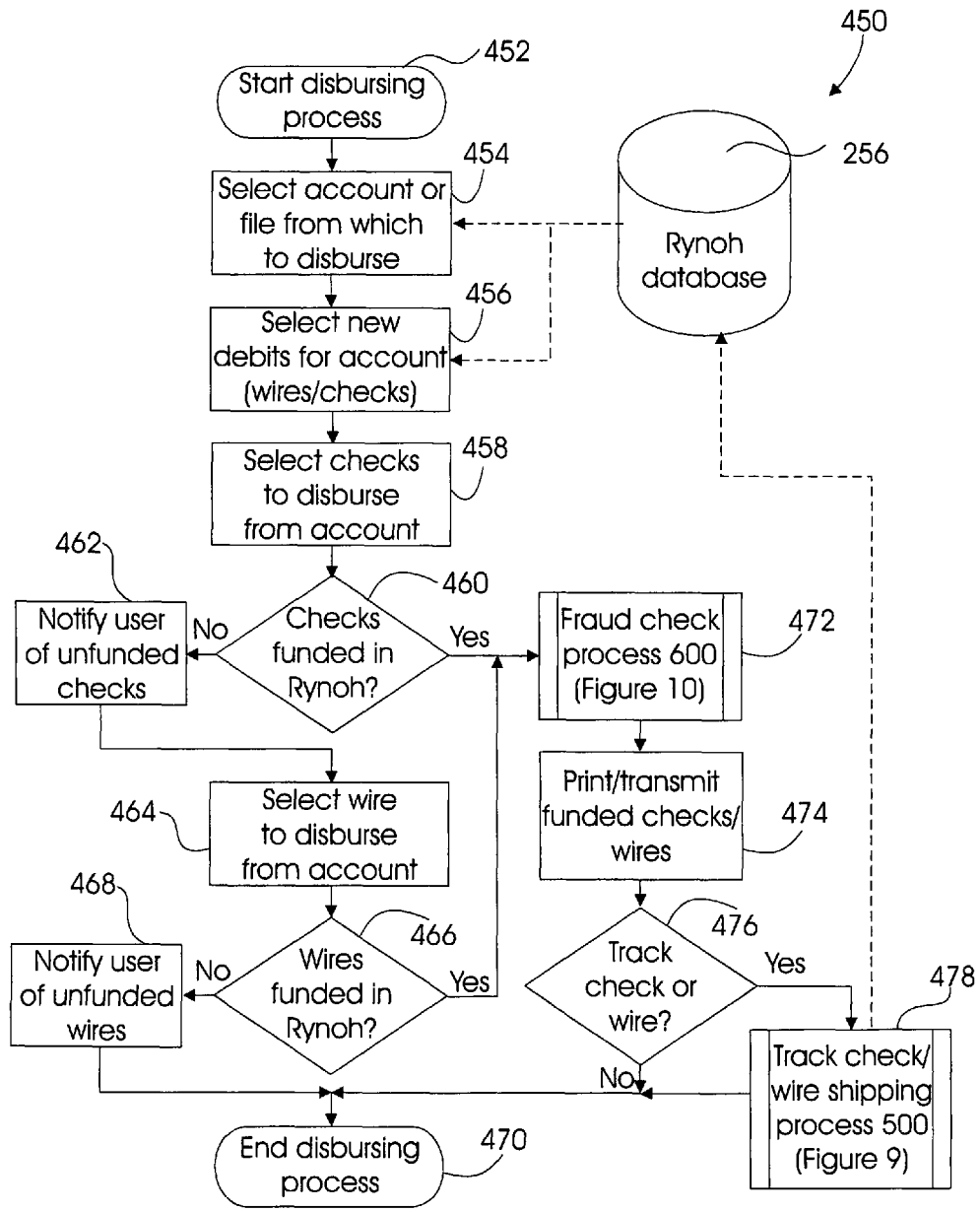
FIG. 7 is a simplified flow chart of the operation of the Disbursement Module of FIG. 2.

Referring now to FIG. 7, there is shown a flow chart of the funds receipt/disbursement (Rynoh+™) module 166, generally at reference number 450. The disbursement process starts at block 452. First an account from which a disbursement is to be made is selected from the Rynoh database 256, block 454.

Once an account is selected, block 454, a disbursement against the selected account is identified, block 456. Disbursements may be made by either check or wire transfer.

Checks to disburse are next identified, block 458, and the disbursement amount is checked to ensure that the necessary funds from which to disburse the check are available, step 460.

If necessary funds are not available, block 460, the user is notified of the condition, block 462, and control is passed to block 464.

Wire transfers are selected, block 464, and a determination is made to ensure that the necessary funds from which to disburse the wire are available, block 466. If necessary funds are not available, the user is notified, block 468, and the disbursement process terminated, block 470.

If necessary funds are available to cover either checks (block 460) or wire transfers (block 466), a fraud check is performed, block 472. Assuming that no fraud is detected, block 472, checks are printed and wire transfers are initiated, block 474.

A check is performed, block 476, to determine if any of the written checks or wire transfers are to be tracked, block 476. If there are no checks or wire transfers to be tracked, block 476, the disbursement process is terminated, block 470. If, however, there are any checks or wire transfers to be tracked, block 476, the tracking process 550 (FIG. 9) is initiated, block 478. Upon completion of the tracking process, the disbursement process is terminated, block 470.

Figure 8:
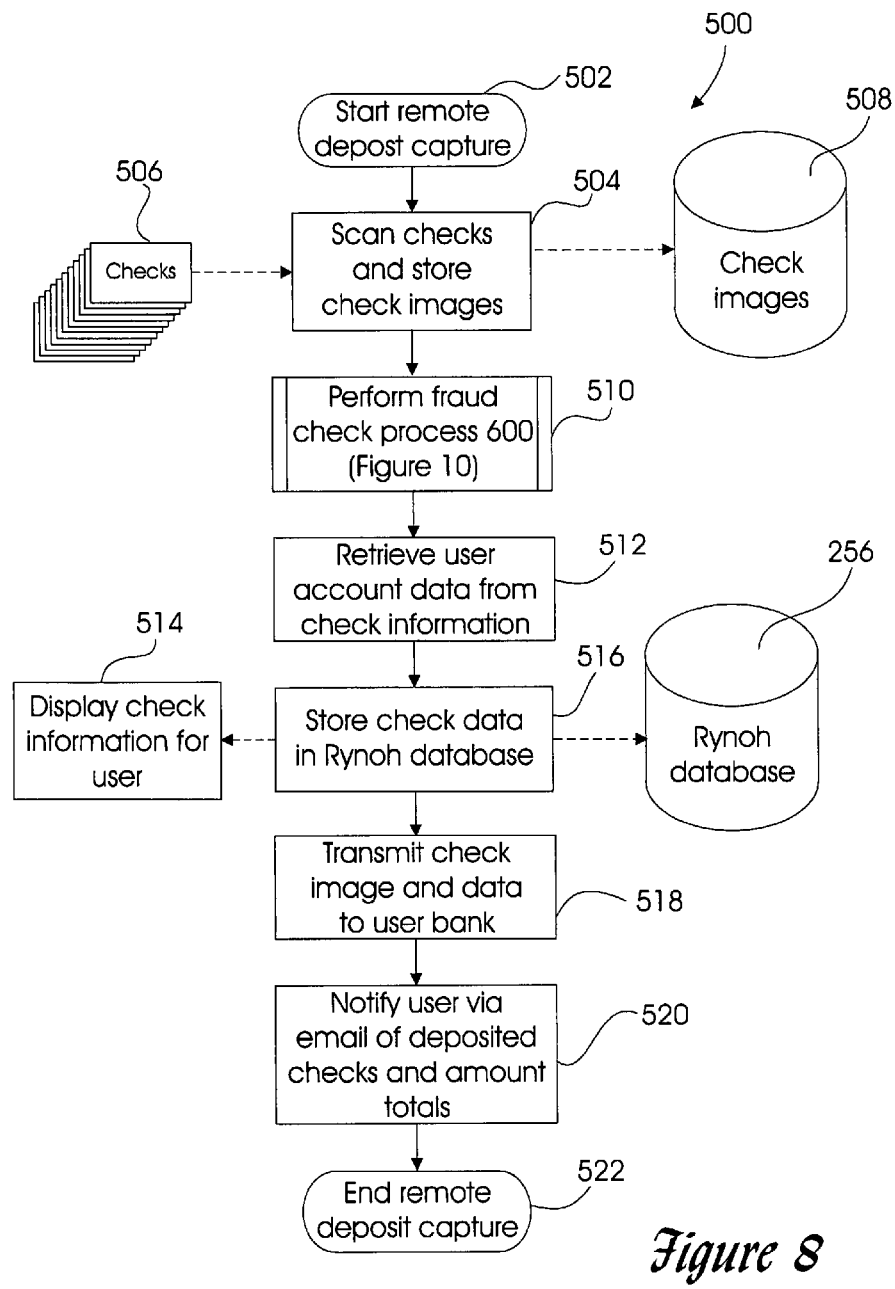
FIG. 8 is a simplified flow chart of the operation of a remote deposit capture module.

Referring now to FIG. 8, there is shown a simplified flow chart of a remote capture module, generally at reference number 500. The remote deposit capture function is started, block 502.

Physical checks 506 are first scanned, and the scanned images stored, block 504. The scanned images are typically stored in a file, shown schematically as check images file 508.

A fraud check is performed on the scanned images in accordance with the fraud check module 600 (FIG. 10), block 510.

User account information is next retrieved from the scanned check images, block 512.

The check information is stored in Rynoh database 256, block 516. Optionally, check data may be displayed for a user, block 514.

The check data is then transmitted to the bank, block 518. The transmitted information includes the scanned images 508.

The user is informed of the deposit, typically by e-mail, block 520. The notification typically includes amount totals. After notification, the remote deposit capture module terminates, block 522.

Figure 9:
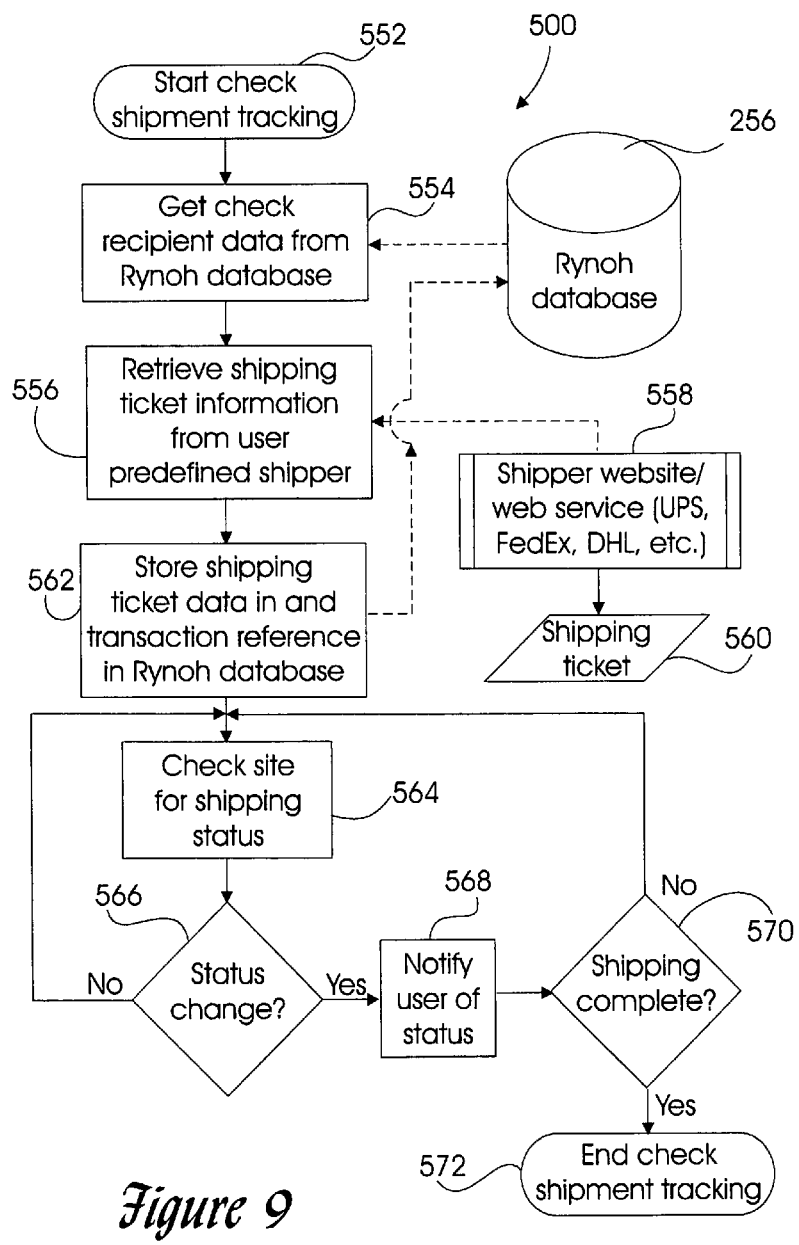
FIG. 9 is a simplified flow chart of the operation of a check shipment tracking module.

Referring now to FIG. 9, there is shown a simplified flow chart of a check shipment tracking module, generally at reference number 550.

The check shipment tracking process starts, block 552, and check receipt data is retrieved from Rynoh database 256, block 554.

Shipping ticket information is next retrieved from various, predefined shippers, block 556. Such information is typically available from the shipper's web site or another web-based service provided by the shipper. While UPS, FedEx, and DHL have been shown (block 558) for purposes of disclosure, it will be recognized that many other potential carriers exist and may also be used in addition to, or as a replacement for these three identified carriers.

Shipping ticket information along with associated transaction information is then stored in the Rynoh database 256, block 562.

The carrier(s) web site is checked for shipping status, block 564.

If a change in shipping status is detected, block 566, the user is notified of the status change, block 568.

If shipping is complete, block 570, the check shipment tracking routine is terminated, block 572. Otherwise, control is returned to block 564.

Figure 10:
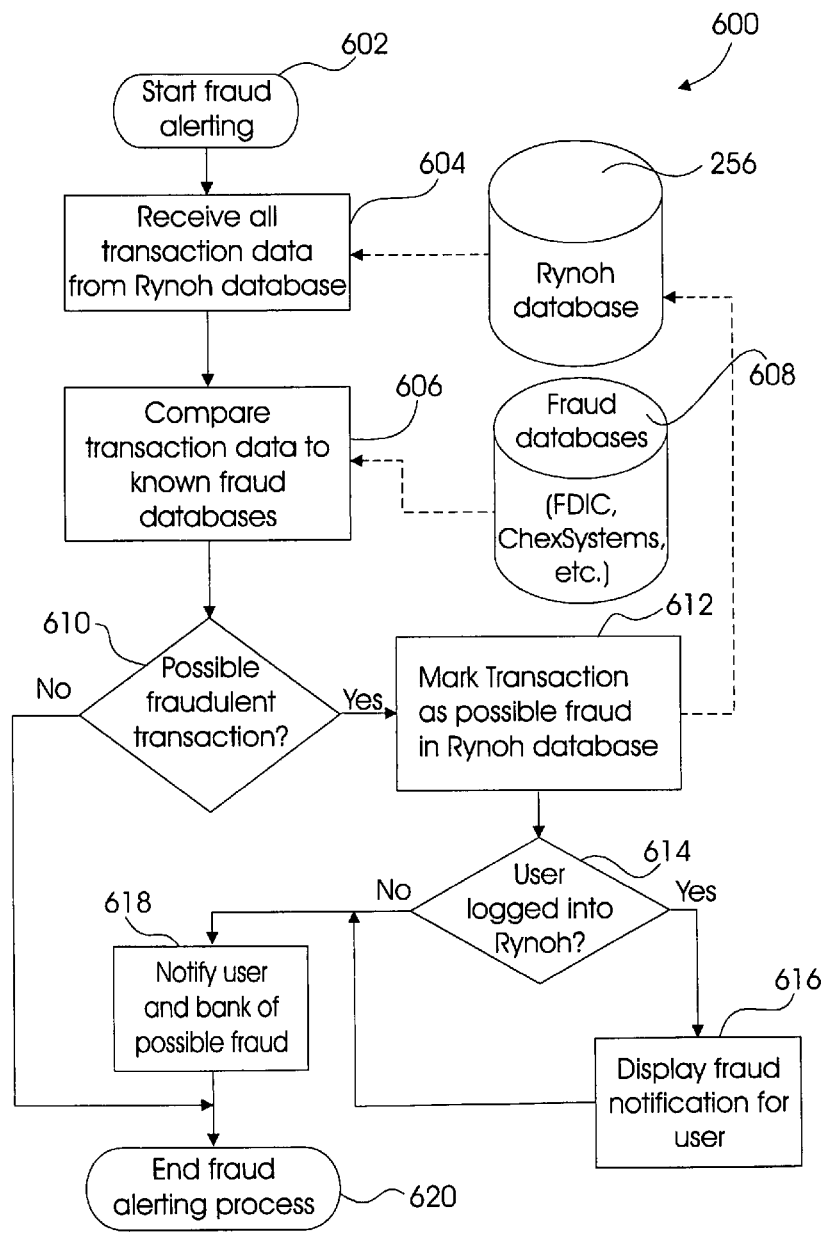
FIG. 10 is a simplified flow chart of the operation of a fraud alert module.

Referring now to FIG. 10, the is shown a simplified flow chart of a fraud detection and alerting module, shown generally at reference number 600.

The fraud detection and alert module 600 is started, block 602. All transactions to be checked are first retrieved from the Rynoh database 256, block 604.

Each transaction is compared to information from well-known fraud databases 608, block 606. Several fraud databases 608, for example Federal Deposit Insurance Corporation (FDIC), ChexSystems, etc., may be checked. Other fraud databases are known to those of skill in the art. Consequently, the process of the present invention is not limited to the databases 608 chosen for purposes of disclosure. Rather, the invention covers any and all fraud databases 608 or other similar sources of fraud information.

If no potentially fraudulent transaction is identified, block 610, the process is terminated, block 620. However, if a possibly fraudulent transaction is detected, block 610, the transaction is flagged as potentially fraudulent and the flagged transaction is stored in the Rynoh database 256, block 612.

If a user is logged into the Rynoh system at the time the transaction is flagged, block 614, the potentially fraudulent transaction is displayed for the user, block 616. Otherwise, control is passed directly to block 618.

The user and the bank are alerted to the possible fraud, block 618, and the process is terminated, block 620

Figure 11:
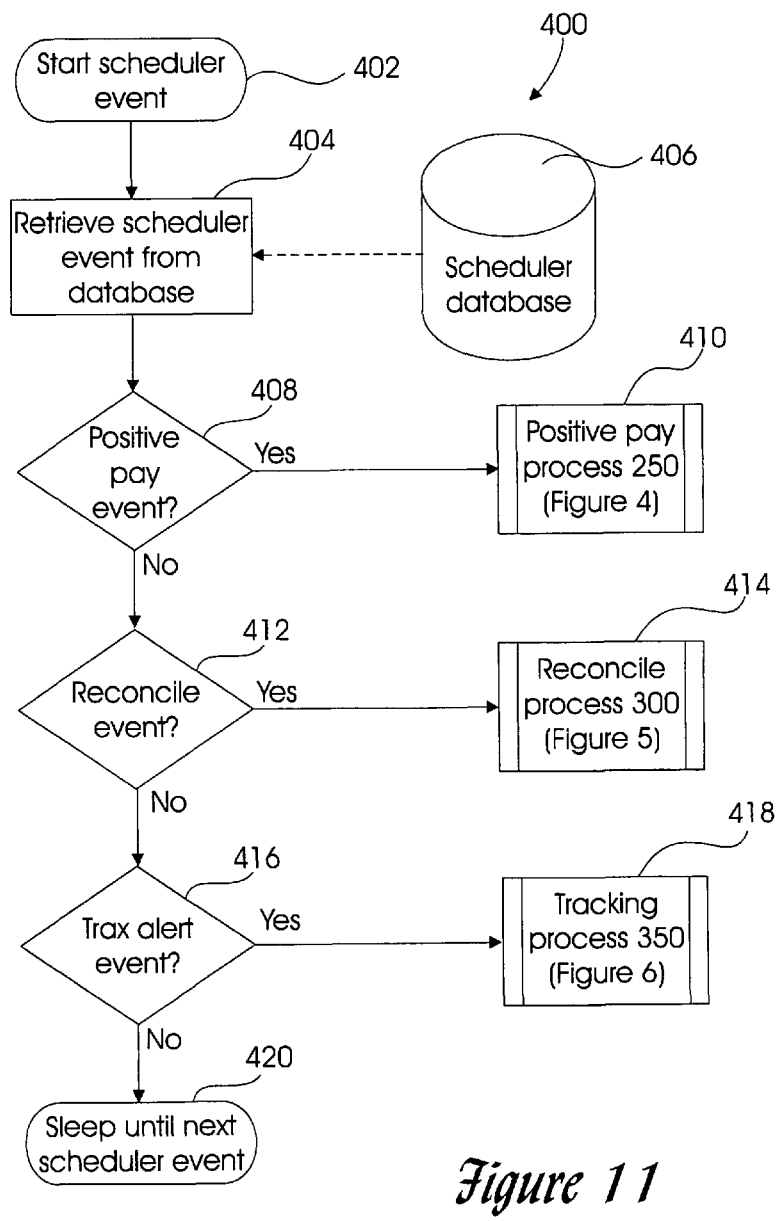
FIG. 11 is a simplified flow chart of the operation of an event scheduler.

As previously stated, the RynohLive™ system 156 is designed for automated operation. Such automation is provided by a scheduler 400, a simplified flow chart of the operation thereof being provided in FIG. 11.

Scheduler 400 is started, block 402, and a scheduled event is retrieved from a scheduler database 406, block 404.

If the retrieved event is a positive pay event, block 408, the scheduler institutes the positive pay process 250 (FIG. 4), block 410. If the event is not a positive pay event, control is transferred to block 412.

If the retrieved event is a reconciliation event, block 412, scheduler 400 institutes the reconcile process 300 (FIG. 5), block 414. If the retrieved event is not a reconciliation event, block 412, control is passed to block 416.

If the retrieved event is a tracking event, block 416, scheduler 400 institutes the tracking process 350 (FIG. 6), block 418. Otherwise, scheduler 400 sleeps until the next scheduler event, block 420.

While only three processes (positive pay 250, reconcile 300, and tracking 350 have been shown as part of scheduler 400 operation, it will be recognized that other modules discussed hereinabove might likewise be incorporated into scheduler 400. It will further be recognized that other modules, processes, etc. not forming a part of the inventive Rynoh system could also be run by scheduler 400.

Figure 12:
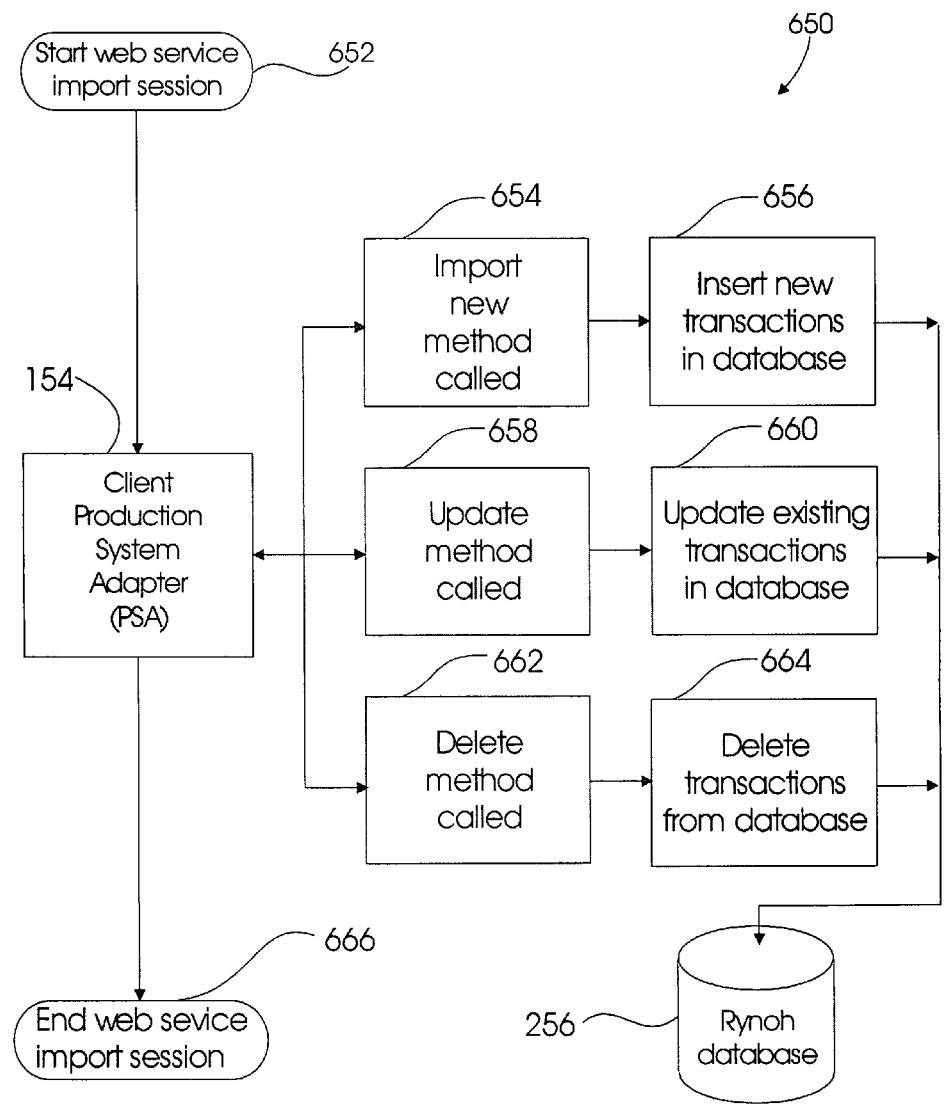
FIG. 12 is a simplified flow chart of a web service import operation.

Referring now to FIG. 12, there is shown a more detailed flowchart of the web service user by RynhoLive™ system for importing data from production system 152 (FIG. 2) via PSA 154 (FIG. 2), generally at reference number 650. The data import operation is summarized in block 214 (FIG. 3). The data import process "pushes" data for checks, wire transfers, deposits, etc. into Rynoh database 256.

The import data session is started, block 652 and the "import new" method is called, block 654 and any new transactions located in the production system 152 are added to the database 256, block 656.

Next, the "update" method is called, block 658, and any transactions in database 256 that must be changed are updated, block 660.

Finally, the "delete" method is called, block 662, and any transactions to be deleted from database 256 are removed therefrom, block 664.

Upon completion of these three operations, the import session is concluded, block 666.

Figure 13:
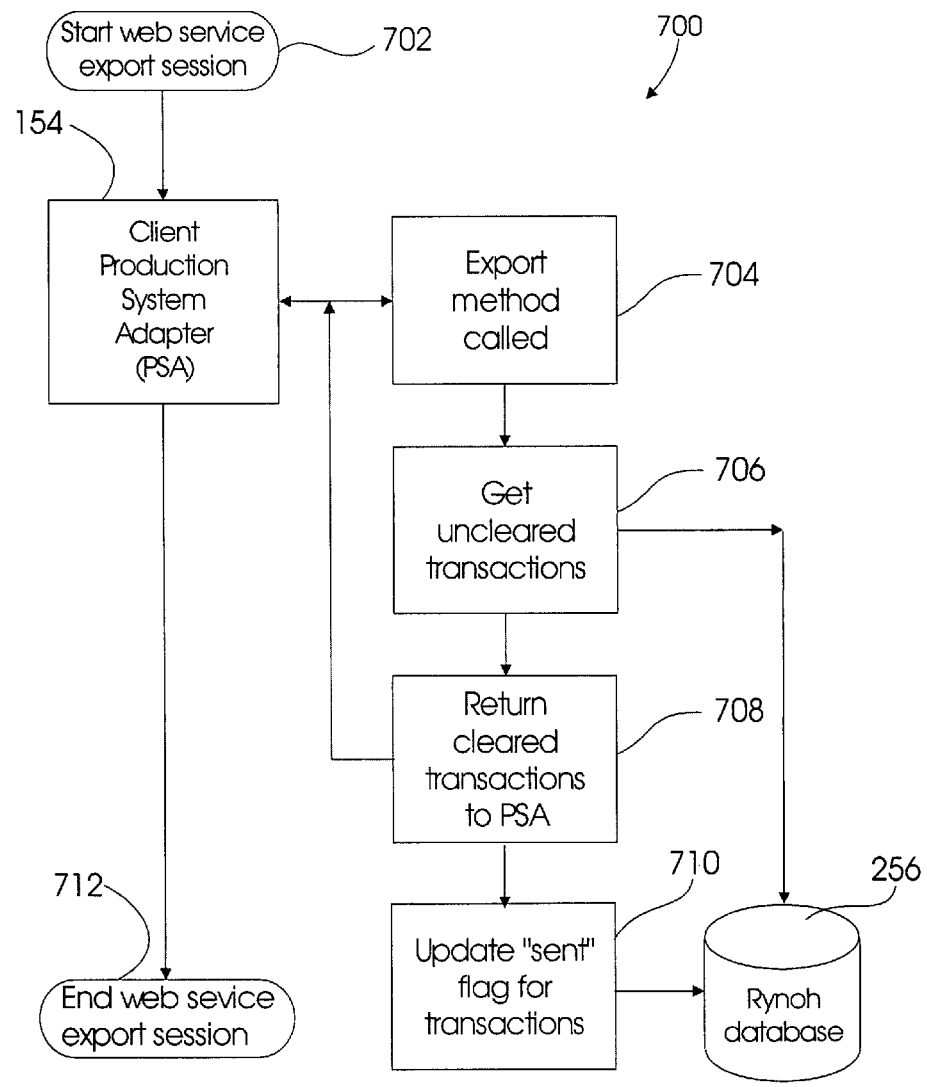
FIG. 13 is a simplified flow chart of a web service export operation.

Likewise, the RynhoLIVE™ system provides an export facility, summarized in block 204 (FIG. 3). Referring now to FIG. 13, there is shown a more detailed flow chart of the export process, generally at reference number 700.

The export session is started, block 702 and the export method is called, block 704. Uncleared transactions remain the database 256, block 706. However, any cleared transactions are returned to production system 152 (FIG. 2) via PSA 154. An update sent flag or similar identifier is associated with each cleared transaction to shown that the information has been sent to production system 152, block 710.

The export process is then concluded, block 712.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of tracking and verifying in real time financial transactions defined at a real estate settlement, the steps comprising:

a) storing, in a database of a settlement financial tracking and verifying computer system, data that includes at least data enumerated on a completed HUD-1 (Housing and Urban Development-1) form associated with a closing upon a piece of real property, wherein said settlement financial tracking and verifying computer system operates automatically and in real time;

b) selecting from said database, by said settlement financial tracking and verifying computer system, data defining at least one anticipated financial transaction enumerated on said completed HUD-1 form, whereby said anticipated financial transaction represents a transfer of funds to be made;

c) automatically initiating in real time a fund transferring action defined by said at least one anticipated transaction selected from the group: disbursing funds, and expecting payments;

d) storing data representative of said initiated fund transferring action in said database as an initiated fund transferring action;

e) automatically tracking in real time each of said initiated fund transferring actions;

f) detecting, by said settlement financial tracking and verifying computer system, completion of each of said initiated fund transferring actions whereby a tracked result is generated;

g) storing in said database, each of said tracked results;

h) automatically comparing in real time said tracked result with said data representative of an associated one of said at least one anticipated transaction stored in said database; and i) automatically alerting in real time a user of said settlement financial tracking and verifying computer system selected from the group comprising a bank, a settlement agent, an attorney, and an auditor when said tracked result differs from said data representative of an associated one of said at least one anticipated transaction.

2. The method as recited in claim 1, wherein said storing data step g) comprises: for each initiated fund transferring action, automatically storing at least one of the pieces of data selected from the group: an amount, a fund source, a payee, a check number, a wire transfer identification, and a date associated therewith in said database.

3. The method as recited in claim 1, wherein said automatically initiating in real time a fund transferring action selected from the group: disbursing funds, and expecting payments, step (c) further comprises the sub-step:

i) when said fund transferring action defines a disbursement, issuing at least one of the group: a check, and a wire transfer; and ii) when said fund transferring action defines an expected payment, verifying receipt of funds associated with said expected payment in accordance with said initiated fund transferring action, said funds being received in one of the forms selected from the group: a certified check, a personal check, a wire transfer, and another form of payment.

4. The method as recited in claim 3, wherein when said fund transferring action defines a disbursement:

iii) creating a positive pay file containing positive pay information representative of at least one of said disbursements; and iv) automatically transmitting said positive pay file to a financial institution upon which the disbursed funds are drawn, thereby making said funds immediately available for disbursement at said financial institution.

5. The method as recited in claim 4, wherein said automatically transmitting said positive pay file to a financial institution upon which the disbursed funds are drawn sub-step (iv) is automatically performed in accordance with a positive pay update schedule associated with said financial institution.

6. The method as recited in claim 3, wherein said verifying receipt of funds sub-step (ii) further comprises the sub-step:

iii) depositing said funds associated with said expected payment into an account associated with said at least one anticipated transaction.

7. The method as recited in claim 3, further comprising, prior to disbursing funds, iii) determining that adequate, "good" funds to cover said disbursement are available in an account from which funds are to be disbursed; and iv) automatically issuing an alert when funds in said account are in one of the categories: inadequate, and not yet made available for disbursement.

8. The method as recited in claim 3, further comprising, when said disbursement is a check, performing the sub-step:

iii) shipping said check to its intended recipient and storing data representing a shipping status associated with said shipped check in said database;

iv) automatically tracking, by the settlement financial tracking and verifying computer system, the shipment status of said check; and v) when said stored shipping status changes, automatically issuing an alert regarding the change of shipping status.

9. The method as recited in claim 1, wherein said automatically alerting in real time step i) comprises the sub-step:

i) determining if said anticipated transaction is fraudulent.

10. The method as recited in claim 9, wherein said determining if said anticipated transaction is fraudulent sub-step (i) comprises checking a fraud database.

* * * * *